Dec. 11, 1923.
H. F. GADE
1,477,051
LUBRICATING MEANS FOR LOOSE PULLEYS, GEARS, ETC
Filed Dec. 20, 1921   2 Sheets-Sheet 1
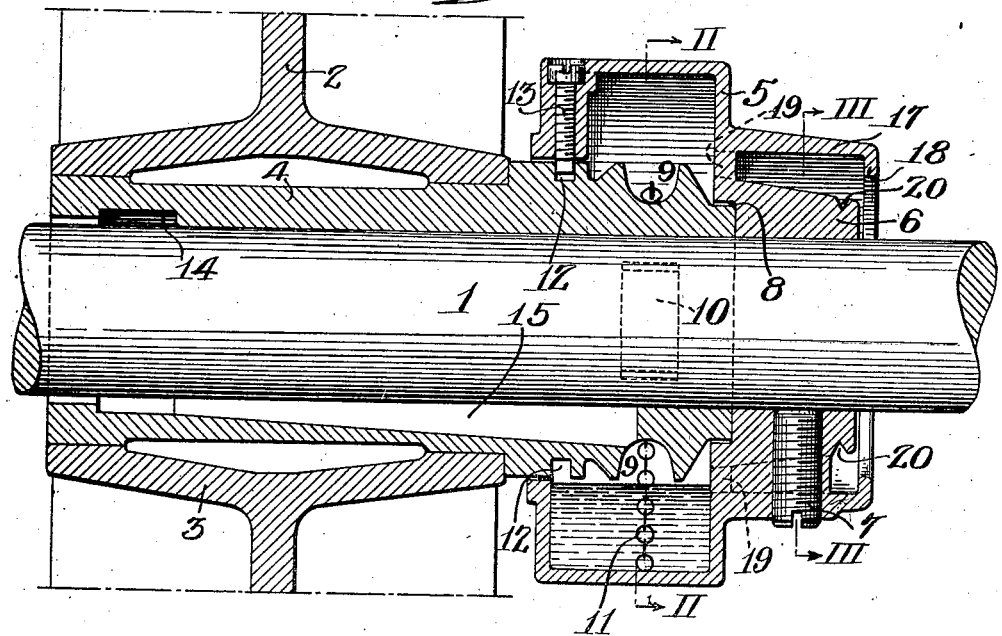
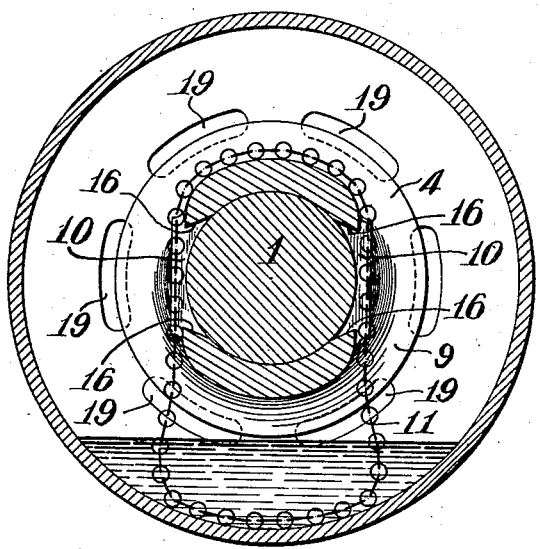
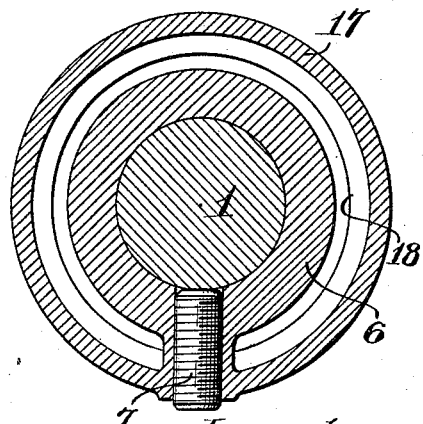
Witness:
Walter Elison.
Inventor:
Harald F. Gade,
by Murray C. Boyer
Attorney.

Dec. 11, 1923.
H. F. GADE
1,477,051
LUBRICATING MEANS FOR LOOSE PULLEYS, GEARS, ETC
Filed Dec. 20, 1921
2 Sheets-Sheet 2

Inventor
Harald F. Gade.

Patented Dec. 11, 1923.

1,477,051

UNITED STATES PATENT OFFICE.

HARALD F. GADE, OF PHILADELPHIA, PENNSYLVANIA, ASSIGNOR TO STANDARD PRESSED STEEL CO., OF JENKINTOWN, PENNSYLVANIA, A CORPORATION OF PENNSYLVANIA.

LUBRICATING MEANS FOR LOOSE PULLEYS, GEARS, ETC.

Application filed December 20, 1921. Serial No. 523,627.

*To all whom it may concern:*

Be it known that I, HARALD F. GADE, a subject of the King of Norway (having declared my intention of becoming a citizen of the United States), and a resident of Philadelphia, Pennsylvania, have invented certain new and useful Improvements in Lubricating Means for Loose Pulleys, Gears, Etc., of which the following is a specification.

My present invention relates to improvements in structures of the general type set forth in the application filed by myself and John March, March 3, 1921, Serial Number 449,389, and one object of my present invention is to provide a loose pulley, gear, idler or the like, which may receive a bushing of the general type set forth in the application for patent before referred to, with a special form of lubricant-applying means cooperating with the bushing, which lubricating means will be in the active position when the loose pulley or other movable element carrying such bushing is in motion, for the purpose of properly lubricating the same.

A further object of my invention is to provide a lubricant-receiving cup or shell which may be fixed to the shaft and rotate with the latter when the loose pulley or other movable element carrying the bushing is at rest; such lubricant-receiving shell being at rest with the shaft when the loose pulley or other movable element is in motion.

A further object of my invention is to provide a flexible lubricant-distributing member, which may be in the form of a chain, disposed in an annular recess formed in the bushing, which recess is aligned with the lubricant-receiving shell so that said distributing member may dip into lubricant carried therein. In order that the lubricant picked up by the chain or other member may be distributed to the shaft, the wall surrounding the recessed portion of the bushing is cut through or apertured at one or more points to expose the shaft, and in one form of my improved structure, a pair of apertures, oppositely disposed, may be provided for the purpose.

A still further object of my invention is to retain the bushing against endwise movement with respect to the lubricant-receiving cup or shell fixed to and rotating with the shaft.

These and other features of my invention are more fully described hereinafter; reference being had to the accompanying drawings, in which:

Figure 1, is a sectional elevation of a loose pulley and bushing therefor, and one form of lubricant-receiving and distributing means within the scope of my invention.

Figs. 2 and 3, are cross-sectional views on the lines II—II, and III—III, Fig. 1.

Figure 4:
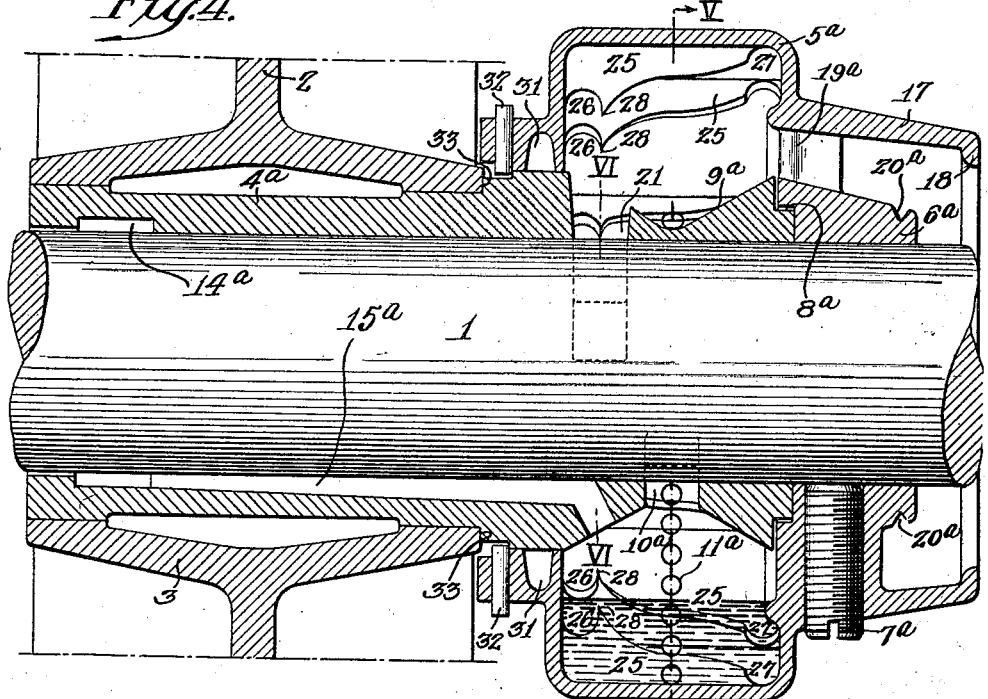
Fig. 4, is a sectional elevation, similar to Fig. 1, illustrating another form of lubricant-receiving and distributing means embodying my invention.

In Figs. 1, 2 and 3, of the drawings, 1 represents a shaft upon which a loose pulley, gear, idler, or other similar element 2 may be mounted, usually adjacent to a fast pulley or similar element (not shown); such loose pulley having a hub 3, the inner wall of which is finished to receive a bushing 4, of the same general type as those illustrated in the co-pending application before referred to, and to which hub such bushing is rigidly secured.

Carried by the shaft 1, and receiving one end of the bushing, which latter is free to rotate with respect to the same, is a lubricant-receiving shell or cup 5, having a hub 6, fitting the shaft 1, and said shell 5 may be held in a fixed position with respect to the shaft by a set screw 7, passing through its hub 6.

The end of the bushing 4 may enter an annular recess 8 formed in the hub portion 6 of the lubricant-receiving cup or shell 5, in the manner indicated in the drawings; the relation being such that each member is free to rotate with respect to the other, that is to say, when the loose pulley or other element with its bushing is in motion, the lubricant-receiving cup will be at rest with the shaft, and when the shaft is in motion, the loose pulley or other element with its bushing will be at rest.

The laterally projecting portion of the bushing which enters the shell 5, has an annular recess or groove 9; the wall of which is cut away at 10, to expose the shaft, and in the form of structure illustrated in Figs. 1, 2 and 3, oppositely disposed apertures 10 are formed in the wall of such recess. Adapted to lie in this recess or groove 9, and set in motion when the bushing is rotating with the loose pulley or other element, is an oiling ring or chain 11, dipping into the body of lubricant carried by said shell. While in some instances I may employ a plurality of lubricant-distributing elements, in the present instance I have shown a single chain.

In addition to the annular recess or groove 9, the bushing may have an annular groove 12, which may be engaged by a set screw 13, carried by the lubricant-receiving shell, and serving to prevent endwise movement of the bushing with respect to the shell 5. The opposite end of the bushing may be provided with an internally disposed annular recess 14, communicating with a longitudinal groove 15 formed in the inner wall of the bushing, which may lead to and through the wall of the annular recess 9, for a purpose to be described.

The longitudinal edges of the apertures 10, formed in the wall of the bushing opposite the annular recess 9, are beveled as clearly indicated at 16, for the purpose of catching the lubricant delivered by the chain for distribution to the shaft, such feature and the function thereof being shown and described in the application for patent before referred to. Each longitudinal edge of these apertures is arranged in this manner in order that the lubricant-receiving shell may be applied to either side of a loose pulley bushing, which may rotate in either direction.

Beyond the hub 6 of the shell 5, I provide a flange 17 with an inturned edge 18, and communication between the pocket formed by such flange and the interior of the shell 5 may be afforded by a series of passages 19, formed in the wall of the shell surrounding the hub 6, so that lubricant may be introduced into the shell by pouring the same into the pocket formed by said flange 17.

When the loose pulley or other element is rotating, the bushing carried thereby moves within the lubricant-receiving shell and the chain, being carried around by the same, will distribute lubricant upon the shaft in its contact with the latter through the openings 10, and provide the desired lubrication for the loose pulley bushing. Any lubricant moving along the shaft between it and the bushing will be caught by the annular groove or recess 14, and will return to the shell 5 through the passage formed by the longitudinal groove 15.

The oil-receiving shell 5, is fixed to and rotates with the shaft and fast pulley and, due to the centrifugal action, the lubricant within said shell will be thrown out and cling to the inner wall of the same without danger of discharge. When the shaft stops, the body of lubricant will collect in the bottom of the shell and be ready for contact with the lubricant-distributing chain carried by the bushing. Any lubricant which may tend to pass over the surface of the hub 6 during either condition will be caught by an annular groove 20, formed in the surface of the same, and drip into the pocket provided by the flange 17.

Figure 5:
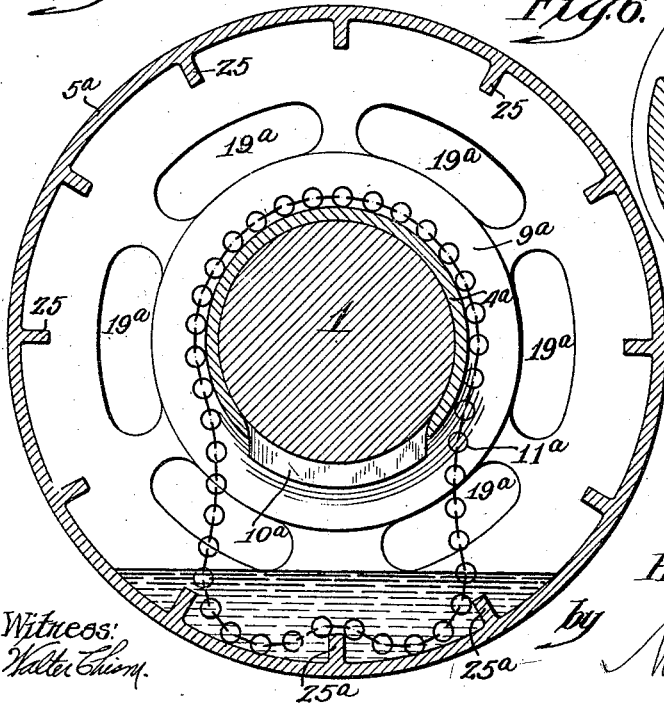
Figs. 5 and 6, are cross-sectional views on the lines V—V, and VI—VI, Fig. 4.
Figure 6:
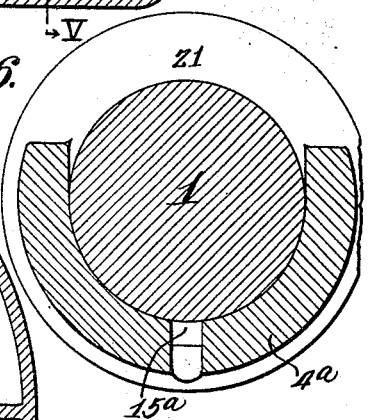

In the form of structure illustrated in Figs. 4, 5 and 6, I have shown an arrangement in which a modified form of lubricant-receiving shell 5$^a$, is provided, having a hub 6$^a$ through which a retaining screw 7$^a$ may be passed, and which may be employed with a bushing 4$^a$ designed to accommodate a chain 11$^a$ or other lubricant-distributing element.

The end of the bushing entering the shell 5$^a$ is provided with an annular recess or groove 9$^a$, which tapers from its root gradually to the surface of the bushing, around which passes the flexible lubricating-distributing member, in this instance the chain. A part of the wall of this annular recess is cut away at 10$^a$, such opening being made at the root of the annular recess and in this particular arrangement of my invention, only one aperture is provided in the bushing in the plane of said root. In the present arrangement, however, an additional aperture is provided, indicated at 21, the same being designed for a purpose hereinafter described.

In this form of structure, I may provide the inner surface of the peripheral wall of such shell with a series of ribs 25, the edges of which may have a curved outline as clearly shown in the drawings. The ribs are preferably of the contour indicated; being inclined generally from one side of the shell to the other, and they include incurved recesses 26 and 27, at their junction with the side walls of the shell. The incurved recesses 26 form, with the body of the ribs, the pointed portions 28, and in practice, any lubricant thrown by the chain against the peripheral wall of the shell carrying these ribs will be caught by the latter and will drip therefrom.

In addition to the aperture 10$^a$ formed in the annular groove or chain-receiving recess of the bushing 4$^a$, I provide the latter with the second aperture 21, which may be disposed at the opposite side of the bushing with respect to the aperture 10$^a$, and preferably in such relation to the ribs of the lubricant-receiving shell that any lubricant dripping from the points 28, of said ribs may fall centrally with respect to said aperture 21 and pass to the shaft when such bushing is in motion.

The ribs of the structure illustrated in Figs. 4, 5 and 6 are designed more particularly to catch lubricant raised by the lubricant-distributing member, the chain for instance, and in practice lubricant raised by such chain is splashed upon said ribs; motion of the chain being rarely if ever of such a character or extent as to cause it to come in contact with said ribs which receive the lubricant by splash contact.

It has been found in practice that the edge of the ribs should be in the nature of a continuous, downwardly inclined, surface, in order that the lubricant received thereby may be influenced by the force of gravity to the desired dripping point. If curved in the manner illustrated in Fig. 4, each point of the curved surface, from the highest to the lowest, must be successively lower than the point immediately preceding the same, and, in lieu of a curved surface straight, inclined surfaces, may be given to the said ribs, terminating at the points 28.

In all instances, I desire to preserve the relatively pointed arrangement indicated by drawings, from which points the lubricant may drip onto the rotating bushing; such lubricant passing to the shaft through the notched portions of said bushing; the greater portion, if not all, of such dripping lubricant being directed toward the opening or notch 21 of the bushing and when this is not beneath said points, the lubricant will engage the beveled wall of the chain receiving recess and pass to the shaft through the opening or notch 10$^a$.

By reason of the beveled or tapered surface of the annular recess 9$^a$ through which the notch or opening 21 is cut, the lubricant-distributing chain, although subject to displacement before the structure is installed, will gravitate to the root of such recess for movement in its proper orbit or plane, for the proper distribution of lubricant, after proper installation. As in the structure shown in Fig. 1, the bushing shown in Fig. 4, may be provided with an annular recess 14$^a$, communicating with a longitudinal groove 15$^a$ formed in the wall of the bushing, which may lead to and through the wall of the annular recess 9$^a$, for a similar purpose.

The shell shown in Figs. 4, 5 and 6, may have one of its walls provided with an annular recess 31 adjacent the hub of the pulley and this groove will serve to trap any oil that may move along the surface of the bushing. The lubricant-receiving shell may be held against endwise movement with respect to the bushing, by means of pins 32, passing through the wall of the shell 5$^a$ and engaging a shoulder 33 of the bushing. In other respects the lubricant-receiving shell or receptacle illustrated in Figs. 4, 5 and 6, is substantially like that shown in Figs. 1, 2 and 3.

I claim:

1. In a lubricating device for loose pulleys, the combination with a shaft and a loose pulley or similar element journaled on said shaft, of a shaft engaging portion carried by the pulley and projecting to one side of the same, a lubricant-receiving shell fixed to the shaft at one side of said pulley and movable with said shaft; the projecting part of the shaft engaging portion carried by the pulley extending into said lubricant-receiving shell, and lubricant-distributing means carried by said projecting part and dipping into a body of lubricant carried by said shell.

2. In a lubricating device for loose pulleys, the combination with a shaft and a loose pulley or similar element journaled on said shaft and having a shaft-engaging portion carried thereby and projecting at one side of the same, of a lubricant-receiving shell fixed to the shaft at one side of said pulley and movable with said shaft; the projecting part of the shaft-engaging portion carried by said pulley extending into said lubricant-receiving shell and having an annular recess with an aperture through its wall exposing the shaft, and lubricant-distributing means disposed in the recess of said projecting part and dipping into a body of lubricant carried by said shell; the apertured wall of such annular recess permitting the lubricant to reach the shaft.

3. In a lubricating device for loose pulleys, the combination with a shaft and a loose pulley or similar element journaled on said shaft, of a bushing carried by said pulley and interposed between the same and the shaft, a lubricant-receiving shell fixed to the shaft at one side of said pulley and movable with said shaft; said bushing projecting laterally from said pulley into said lubricant-receiving shell, and lubricant-distributing means carried by the projecting portion of said bushing and dipping into a body of lubricant carried by said shell.

4. In a lubricating device for loose pulleys, the combination with a shaft and a loose pulley or similar element journaled on said shaft, of a bushing carried by said pulley and interposed between the same and the shaft, a lubricant-receiving shell fixed to the shaft at one side of said pulley and movable with said shaft; said bushing projecting into said lubricant-receiving shell and having an annular recess with an aperture through its wall exposing the shaft, and lubricant-distributing means disposed in the recess of the projecting portion of said bushing and dipping into the body of lubricant carried by said shell; the apertured wall of such annular recess permitting the lubricant to reach the shaft.

5. In a lubricating device for loose pulleys, the combination of a shaft, a loose pulley or similar element journaled on said shaft, a bushing carried by said pulley and interposed between the same and the shaft; said bushing being rotatable on the shaft, a lubricant-receiving shell fixed to the shaft at one side of said pulley and movable with said shaft; said bushing projecting into said lubricant-receiving shell and adapted to rotate with respect to the same, and freely movable lubricant-distributing means carried by the projecting portion of said bushing and dipping into the body of lubricant carried by said shell; the wall of said projecting portion of the bushing lying within the lubricant-receiving shell being apertured to expose the shaft for reception of lubricant raised by said distributing means, and provided with beveled edges adjacent said apertured portion to catch lubricant flowing onto the shaft.

6. In a lubricating device for loose pulleys, the combination of a shaft, a loose pulley or similar element thereon, a bushing rotatable on the shaft and fixed to the loose pulley, a shell forming a lubricant-receiving chamber fixed to the shaft at the side of the pulley and receiving one end of the bushing, a chain carried by the bushing and dipping into the body of lubricant within the shell; said bushing being apertured to expose the shaft in the path of said chain, and an outwardly disposed flange carried by said lubricant-receiving chamber.

7. In a lubricating device for loose pulleys, the combination of a shaft, a loose pulley or similar element thereon, a bushing rotatable on the shaft and fixed to the loose pulley, a shell forming a lubricant-receiving chamber disposed at the side of the pulley; said shell having a hub fixed to the shaft and receiving at its opposite side one end of the bushing, a chain carried by the bushing and dipping into the body of lubricant within the shell; said bushing being apertured to expose the shaft in the path of said chain, and an outwardly disposed flange carried by said lubricant-receiving chamber and serving to catch lubricant passing from the hub of the shell.

8. In a lubricating device for loose pulleys, the combination of a shaft, a loose pulley or similar element thereon, a bushing rotatable on the shaft and fixed to the loose pulley, a shell forming a lubricant-receiving chamber fixed to the shaft at the side of the pulley and receiving one end of the bushing, lubricant-distributing means carried by the bushing and dipping into the body of lubricant within the shell, and means preventing endwise movement of the bushing with respect to the shell but permitting rotative movement of each with respect to the other.

9. In a lubricating device for loose pulleys, idlers, and the like, the combination with a shaft and a loose pulley, idler, or the like journaled on said shaft, of a bushing carried by said pulley and interposed between it and the shaft, a lubricant-receiving shell fixed to the shaft at one side of said pulley and movable with said shaft; said bushing projecting into said lubricant-receiving shell, lubricant-distributing means carried by the projecting portion of said bushing and dipping into a body of lubricant carried by said shell; said lubricant-distributing means encircling the bushing and movable with the latter, and means carried by the lubricant-receiving shell for collecting lubricant carried up by the lubricant-distributing means when said shell is at rest.

10. The combination with a shaft and a loose pulley or idler journaled on said shaft, of a bushing carried by said pulley and interposed between it and the shaft, a lubricant-receiving shell fixed to the shaft at one side of said pulley and movable with said shaft; said bushing projecting into said lubricant-receiving shell and having an apertured wall exposing the shaft, lubricant-distributing means carried by the projecting portion of said bushing and dipping into a body of lubricant carried by said shell; said lubricant-distributing means encircling the bushing and movable with the latter, and a series of ribs carried on the inner surface of the lubricant-receiving shell for collecting lubricant carried up by the lubricant-distributing means and from which it may drip onto the shaft and bushing.

11. In a lubricating device for loose pulleys and the like, the combination of a shaft, a loose pulley or similar elements journaled thereon, a bushing fixed to the loose pulley and rotatable on said shaft, a lubricant receiving shell fixed to the shaft at the side of the pulley and receiving one end of the bushing; the latter having an annular recess with its wall apertured to expose the shaft, flexible lubricant-distributing means adapted to said annular recess and dipping into a body of lubricant carried by said shell, said lubricant-distributing means encircling the bushing and movable with the latter, and a series of ribs carried on the inner surface of the lubricant-receiving shell; said ribs serving to collect lubricant raised up and splashed by the lubricant-distributing means and being inclined whereby said lubricant may collect at one point of said ribs and drop therefrom onto the shaft and bushing.

12. In a lubricating device for loose pulleys and the like, the combination of a shaft, a loose pulley or similar element journaled thereon, a bushing fixed to the loose pulley and rotatable on said shaft, a lubricant-receiving shell fixed to the shaft at the side of the pulley and receiving one end of the bushing; the latter having its wall apertured to expose the shaft, flexible lubricant-distributing means adapted to said annular recess and dipping into a body of lubricant carried by said shell; said lubricant-distributing means encircling the bushing and being free to move with and by the latter, and projecting on the inner surface of the lubricant-receiving shell; said projections serving to collect lubricant raised up and splashed by the lubricant-distributing means and being inclined whereby the lubricant may collect at one point and drop therefrom onto the shaft and bushing.

13. In a lubricating device for loose pulleys, the combination with a shaft and a loose pulley or similar element journaled on said shaft, of a bushing carried by said pulley and interposed between the same and the shaft, a lubricant-receiving shell fixed to the shaft at one side of said pulley and movable with said shaft; said bushing projecting into said lubricant-receiving shell, lubricant-distributing means carried by the projecting portion by said shell, and projections carried by the shell against which the lubricant may be splashed thereby.

14. In a lubricating device for loose pulleys, the combination with a shaft and a loose pulley or similar element journaled on said shaft, of a bushing carried by said pulley and interposed between the same and the shaft, a lubricant-receiving shell fixed to the shaft at one side of said pulley and movable with said shaft; said bushing projecting into said lubricant-receiving shell and having an annular recess with an aperture through its wall exposing the shaft, and lubricant-distributing means carried in the recess of the projecting portion of said bushing and dipping into the body of lubricant carried by said shell; the apertured wall of such recess permitting the lubricant to reach the shaft, and projections carried by the shell against which the lubricant may be splashed by the lubricant-distributing means and from which it may drip.

15. The combination of a shaft, a loose pulley surrounding said shaft and rotatable with respect to the same, a bushing interposed between the loose pulley and shaft; said bushing being fixed to said pulley and projecting from the side of the same, a lubricant-receiving shell fixed to the shaft and enclosing the projecting end of said bushing, a lubricant-distributing chain carried by the projecting end of the bushing and movable with the latter; said bushing having an aperture in the wall over which the lubricant-distributing chain passes exposing a portion of the shaft and whereby vertical motion is imparted to the lubricant-distributing chain in addition to the rotative movement thereof.

16. The combination of a shaft, a loose pulley rotatable with respect to said shaft, a bushing fixed to the loose pulley and interposed between the same and said shaft; said bushing having a portion projecting from the side of the loose pulley, an oil-receiving shell fixed to the shaft and enclosing the projecting end of said bushing, an oiling chain carried by the projecting end of the bushing and movable with the latter, said bushing having oppositely disposed apertures in its wall over which the oiling chain passes to expose portions of the shaft and whereby vertical motion may be imparted to the oiling chain in addition to the rotative movement thereof.

17. The combination of a shaft, a loose pulley, a bushing fixed to said pulley and rotatably mounted on the shaft; said bushing having a portion projecting beyond the face of the pulley, an oil-container fixed to the shaft and having a portion enclosing the projecting end of the bushing; said projecting end having an annular groove, an oiling chain arranged in said groove; the wall of the bushing in which said groove is formed being apertured to expose the shaft for the application of oil raised by said oiling chain; the bushing with its apertures and solid wall portions between the same effecting changes in the movement of the lubricant-distributing element, and means for preventing endwise movement of the bushing and pulley with respect to the oil-container.

18. The combination of a shaft, a loose pulley, a bushing fixed to said pulley and rotatably mounted on the shaft; said bushing having a grooved and apertured portion projecting beyond the face of the pulley, an oil-receptacle fixed to the shaft and having a portion enclosing the projecting end of the bushing, and an oiling chain arranged in said apertured groove whereby oil may be applied to the shaft through said apertured portion exposing the shaft when said bushing is rotated with the pulley.

In witness whereof I have signed this specification.

HARALD F. GADE.